(12) United States Patent
Pratt et al.

(10) Patent No.: US 10,245,821 B2
(45) Date of Patent: Apr. 2, 2019

(54) REUSABLE NETWORKED 3-D PRINTING

(71) Applicant: AT&T INTELLECTUAL PROPERTY I, L.P., Atlanta, GA (US)

(72) Inventors: James H. Pratt, Round Rock, TX (US); Marc Andrew Sullivan, Austin, TX (US); Ari Craine, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 496 days.

(21) Appl. No.: 14/959,509

(22) Filed: Dec. 4, 2015

(65) Prior Publication Data
US 2017/0157856 A1 Jun. 8, 2017

(51) Int. Cl.
*B29C 67/00* (2017.01)
*B33Y 50/02* (2015.01)
*B33Y 50/00* (2015.01)

(52) U.S. Cl.
CPC ............. *B33Y 50/02* (2014.12); *B33Y 50/00* (2014.12)

(58) Field of Classification Search
CPC ........ B33Y 10/00; B33Y 30/00; B33Y 80/00; B33Y 40/00; B33Y 50/00; G05B 2219/49007; G05B 2219/45238; G05B 19/4099; G05B 2219/35134; Y02P 90/265; B29C 70/382
USPC .................. 700/97, 118, 187, 103, 131, 262
See application file for complete search history.

(56) References Cited

U.S. PATENT DOCUMENTS

| | | | |
|---|---|---|---|
| 3,882,732 | A | 5/1975 | Fletcher et al. |
| 4,736,815 | A | 4/1988 | Barmatz et al. |
| 4,743,361 | A | 5/1988 | Schram |
| 4,877,516 | A | 10/1989 | Schram |
| 4,964,303 | A | 10/1990 | Barmatz et al. |
| 5,006,266 | A | 4/1991 | Schram |

(Continued)

FOREIGN PATENT DOCUMENTS

| | | |
|---|---|---|
| WO | 94/20833 | 9/1994 |
| WO | 2014/029505 | 2/2014 |
| WO | 2014/139260 | 9/2014 |

OTHER PUBLICATIONS

U.S. Appl. No. 14/550,266 to James H. Pratt et al., filed Nov. 21, 2014.

(Continued)

*Primary Examiner* — Shahed Ahmed
(74) *Attorney, Agent, or Firm* — Greenblum & Bernstein P.L.C.

(57) ABSTRACT

A service is provided over a communication network. Initially, information indicative of physical characteristics of an item requested by a requester is received along with a request to generate a physical three dimensional model for the item. The information is transformed into model data used to generate the three dimensional model. Components for generating the physical three dimensional model are obtained from storage. A physical three dimensional model for the item specified by the remote requestor is generated, and imagery descriptive of the physical three dimensional model to the remote requestor via the communication network, and
 returning the components used to generate the physical three dimensional model to storage after the imagery of the physical three dimensional model is sent to the remote requester.

19 Claims, 8 Drawing Sheets

(56) References Cited

U.S. PATENT DOCUMENTS

| | | | |
|---|---|---|---|
| 5,484,537 | A | 1/1996 | Whitworth |
| 6,029,519 | A | 2/2000 | Kulinski |
| 6,766,691 | B2 | 7/2004 | Venturelli et al. |
| 6,936,151 | B1 | 8/2005 | Lock et al. |
| 7,846,382 | B2 | 12/2010 | Strand et al. |
| 8,166,819 | B2 | 5/2012 | Sadarous et al. |
| 8,266,950 | B2 | 9/2012 | Kaduchak et al. |
| 8,865,476 | B2 | 10/2014 | Ward et al. |
| 8,932,520 | B2 | 1/2015 | Goddard et al. |
| 2014/0011146 | A1 | 1/2014 | Monson et al. |
| 2014/0288699 | A1* | 9/2014 | Williams ............ B29C 67/0085 700/233 |
| 2016/0054726 | A1* | 2/2016 | Yoo ..................... G05B 19/4099 700/118 |
| 2016/0078683 | A1* | 3/2016 | Sudol ..................... G06T 19/006 345/633 |
| 2017/0051806 | A1* | 2/2017 | Kang ........................ F16F 7/12 |
| 2017/0124223 | A1* | 5/2017 | Maeda ................... G05B 17/02 |
| 2017/0157841 | A1* | 6/2017 | Green ...................... B29C 64/00 |
| 2018/0009158 | A1* | 1/2018 | Harkness ................ B29C 64/20 |
| 2018/0022028 | A1* | 1/2018 | Fornos .................. B22F 1/0003 366/142 |

OTHER PUBLICATIONS

A video made available on the internet at youtube.com/watch?v=NLgD3EtxwdY, (May 26, 2014).

Ochiai et al., "Pixie Dust: Graphics Generated by Levitated and Animated Objects in Computational Acoustic-Potential Field", ACM Transactions on Graphics (TOG) vol. 33, Issue 4 (Jul. 2014).

A video made available on the internet at youtube.com/watch?v=odJxJRAxdFU (Dec. 31, 2013).

Vergano, "Scientists Move Levitating Objects Through Space fo rthe First Time", downloaded from the internet at news.nationalgeographic.com/news/2014/01/140106-levitation-ultrasonic-video-science/ (Jan. 7, 2014).

"Modiface Launches Photorealistic 3D Augmented Reality Beauty Mirror at CES", downloaded from the internet at modiface.com/news.php?story=470 (Jan. 7, 2014).

Grant, "Ph.Ds apply advanced geometry, 3D simulation to improving e-commerce", downloaded from the internet at venturebeat.com/2013/05/06/comp-sci-phds-apply-advanced-geometry-3d-simulation-to-improving-e-commerce-exclusive/.

A video made available on the internet at youtube.com/watch?v=fk164LXQgaI (May 6, 2013).

Starr, "Acoustic levitation is science wizardry at its best", downloaded from the internet at cnet.com/news/acoustic-levitation-is-science-wizardry-at-its-best/ (Sep. 16, 2012).

Bring, "How new imaging technology can boost your Ecommerce sales", downloaded from the internet at fourthsource.com/ecommerce/imaging-technology-ecommerce-sales-10077 (Aug. 10, 2012).

Graham, "3D Imaging and the Future of Ecommerce", downloaded from the internet at shawngraham.me/blog/3d-imaging-and-the-future-of-ecommerce.

"3D Imaging and the Future of Ecommerce", downloaded from the internet at alphalab.org/3d-imaging-and-the-future-of-ecommerce/ (May 18, 2012).

Moscato et al., "A Critical Analysis of Using 3-D Virtual World Environments in E-Commerce Strategy", downloaded from the internet at iacis.org/iis/2009/P2009_1224.pdf, pp. 267-274, (2009).

Gill, "The Future of 3D E-Commerce", downloaded from the internet at ecommercetimes.com/story/19868.html (Nov. 5, 2002).

Yarns, "Bottling Up Sound Waves", downloaded from the internet at newscenter.lbl.gov/2014/08/04/bottling-up-sound-waves/, Aug. 4, 2014.

"DIY 3D Printing", downloaded from the internet at diy3dprinting.blogspot.com/2014/01/ultrasonic-particle-levitation-could-it.html, Jan. 2014.

Hobson, "3D Acoustic Manipulation: Seemingly-Unreal Levitation Using Soundwaves", downloaded from the internet at hackaday.com/2014/01/03/3d-acoustic-manipulation-seeminly-unreal-levitation-using-soundwaves/, Jan. 3, 2014.

\* cited by examiner

Computer

REUSABLE NETWORKED 3-D PRINTING

BACKGROUND

1. Field of the Disclosure

The present disclosure relates to the field of resource conservation. More particularly, the present disclosure relates to reusable networked 3-D printing resources.

2. Background Information

3-D printing is a form of manufacturing in which a 3-D object is manufactured from a 3-D model under computer control. 3-D printing originally involved sequentially depositing and binding components using, for example, a printer head. 3-D printing has since evolved beyond simple depositing. Recently, 3-D printing has evolved to include generating temporary objects using reusable resources.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
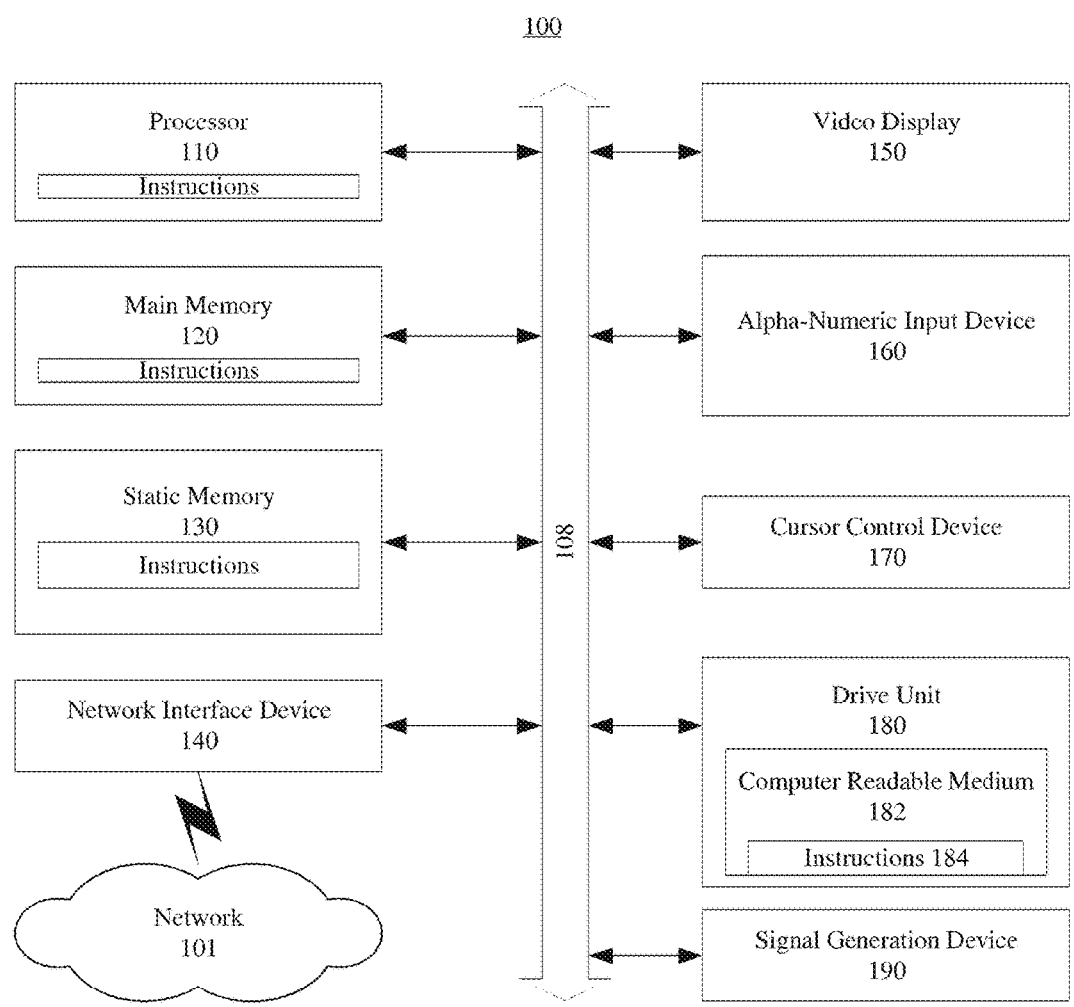
FIG. 1 shows an exemplary general computer system that includes a set of instructions for reusable networked 3-D printing.

FIG. 1 is an illustrative embodiment of a general computer system, on which a method of reusable networked 3-D printing can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a still camera or video camera or device that includes such a still camera and/or video camera, a web appliance, a network router, switch or bridge, a model server, a 3-D model builder, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
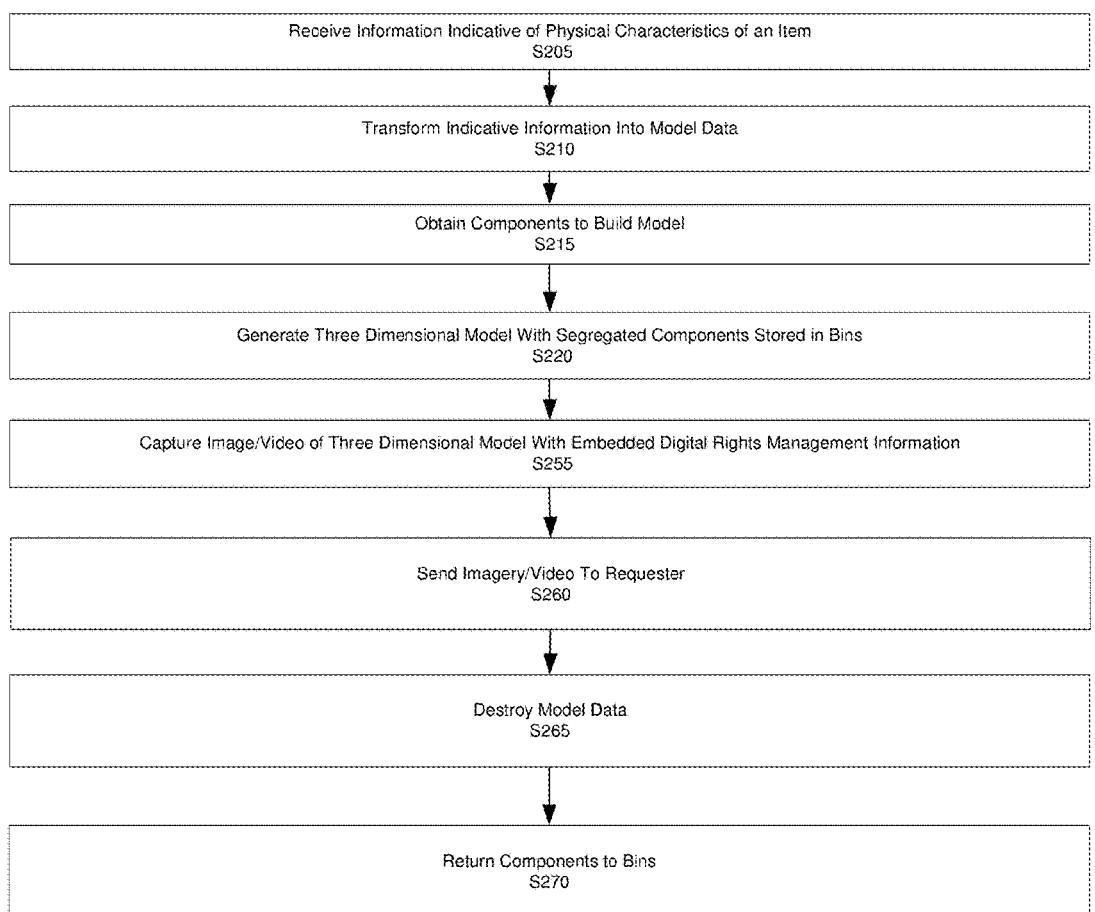
FIG. 2 shows an exemplary method for reusable networked 3-D printing, according to an aspect of the present disclosure.

FIG. 2 shows an exemplary method for reusable networked 3-D printing, according to an aspect of the present disclosure. In FIG. 2, the method starts when information indicative of physical characteristics of an item is received at S205. The information may be sent by a remote user and received over a network by a system for reusable networked 3-D printing. The item is a physical item with characteristics that can be modeled in three dimensions.

The information received at S205 may be a name of the item so long as the name can be correlated with a physical description of the item. The information may also be a tag that can be correlated with a physical description of the item at a known information source (e.g., such as a source that issues the tag). The information may be two-dimensional information such as an image showing physical characteristics of the item. The information may also be the actual physical characteristics, including a shape, size, dimensions, colors, outline etc.

At S210, the information is transformed into model data. Model data described herein is three-dimensional model data, and is data usable specifically to generate a physical three-dimensional model via a 3-D printing process. The model data may include individual component information for each individual component of an item to be built in three dimensions. Individual component information can include component locations, colors, and material etc. The model data can also include information used to relate individual components to one another, such as the sequence in which individual elements are to be placed (printed) by the 3-D printing process.

At S215, components to build the model are obtained from storage. The components may be colored dust particles or other particles that are moved into a position where they can be levitated and horizontally manipulated by sound waves. As an example, the particles used to generate a 3-D model may be within a range of sizes from 0.5 microns to 500 microns. The particles can also be heavier components when the components are being physically stacked in a 3-D printing process such as a conventional sequential deposition process. In any event, the components may be segregated by color, weight, material, and stored separately in different bins for retrieval on-demand in the reusable networked 3-D printing described herein. At S215, the components used to build the model are then obtained from the segregated storage.

At S220, a three-dimensional model is generated in accordance with the model data generated at S210. The three-dimensional model is build using the 3-D printing described herein. The three-dimensional model is built with the components obtained at S215. As described herein, the three-dimensional model built at S220 may be a temporary model that is built using sound waves to levitate and manipulate components individually into place. The sound waves may be generated by banks of speakers placed in arrays on three or more sides of a dedicated space used to build models. The speaker arrays may be placed on the lateral sides and above and below the dedicated space used to build the models. Although not required, the speaker arrays may be placed in a way such that sound waves emanating from individual speakers do not directly counter one another. Individual speakers in arrays may also be arranged in a way such that emanating sound waves do not directly counter sound waves emanating from an opposing speaker in opposing arrays. Individual speakers are used to generate individual sound waves which are, in turn, used to levitate and manipulate individual components into the position desired for the model. The individual speakers and sound waves are controlled and synchronized by a computer in order to coordinate building the physical model. The space in which a 3-D model is built may also be enclosed and isolated from, for example, other forms of sound or movements of air. Thus, a 3-D model may be built in a space that is entirely or almost-entirely enclosed and protected from external air movements and sound waves.

At S255, an image or video of the physical three-dimensional model is captured. The image or video can include digital rights management information such as an embedded digital watermark. Alternatively, the 3-D model builder may "build" a logo in the same way the physical model is built (e.g., by levitating and manipulating individual components), and then the logo can be captured with the three-dimensional model when the image or video is captured. Digital rights management information can be embedded in images or videos in other ways then those described above, so the mechanisms described above should be recognized as only examples of digital rights management information that can be embedded within images and videos.

Information received at S205 may also include embedded digital rights management (DRM) information from the source. For example, information received at S205 may include information indicating a right to generate a temporary 3-D model using the information.

At S260, imagery or video of the physical three-dimensional model is sent to the requester over a communications network. Though not yet described, a requester may access the provider of a 3-D model builder in many different ways, including via a commercial website such as Amazon™ or Priceline™. The 3-D model builder can send imagery or video to the requester directly by email or streaming, and may even send the imagery or video in a way that cannot be directly copied or saved. In this way, imagery or video of a temporary physical model of an item can be provided for review by a requester.

The creator of the physical three-dimensional model or the provider of the imagery or video captured at S255 may specify digital rights management controls such as that the imagery or video is good for one-time use only, or that once the object is printed and images/video transmitted, that the object is to be destroyed so that the material components can be reused. In this way, the creator of the 3-D images or video can upload a file to the server service, and have such a video streamed to the end user in pieces. Digital rights management restrictions may prohibit copies of the images or videos sent to the requester over the network(s) 210 in FIG. 2.

At S265, the model data used to build the physical model is destroyed along with the physical model. In this way, model data can be confirmed as original content that is both created for a particular use upon request, and then destroyed immediately thereafter. Model data can be destroyed or rendered unusable using a timer, a one-time or other limited-use control, or other forms of control that can be implemented using software instructions that accompany the model data.

Of course, model data does not have to be destroyed after being used to build a model. In an embodiment, some or all model data may be retained and even re-used. For example, model data can be stored in a library under the management of the 3-D model builder or a third party. Model data may also be provided to a requester when the requester, for example, agrees to purchase the rights to the model data and/or model from the 3-D model builder. Of course, a requester may also agree to purchase the images or video of the 3-D physical model, and/or the rights to the images or video of the 3-D physical model, built by the 3-D model builder.

A library may be maintained, for example, under the control of a centralized system through which 3-D physical models are requested from 3-D model builders. For example, an online retailer website may provide links to multiple 3-D model builders all over the world, so that a requester requesting to view a physical 3-D model of an item can request the 3-D model from a selected 3-D model builder. In this way, a website such as Amazon.com™ can provide users with access to multiple 3-D model builders. Users can then selectively request (and pay for) images or videos of a 3-D model of an item from the selected 3-D model builder. The centralized system may then provide the model data for the item to the selected 3-D model builder to use A centralized networked system may also be used to intermediate requests on behalf of users. Users may directly contact such a centralized networked system, or may be redirected to such a centralized networked system from websites such as online retailers. The centralized networked system can then provide options to the users over the internet, such as via a web page, to choose from 3-D model builders. The centralized networked system may provide a list of 3-D model builders, along with differing characteristics offered by different 3-D model builders. For example, different 3-D model builders may offer narrations in different languages. Different 3-D model builders may be physically located in different regions, countries or even continents. Different 3-D model builders may also have different 3-D model systems, such as 3-D model systems from different manufacturers, with different capabilities (e.g., color, size, level of detail), and so on. In this way, the centralized networked system can offer users a variety of different 3-D model builders with different characteristics to choose from.

At S270, components used to build the physical model are returned to the storage from which they were obtained. The components may be separated by color, weight, density, size (for example: diameter) or other identifiable characteristics, and then segregated in different storage compartments from which they can be retrieved.

Figure 3:
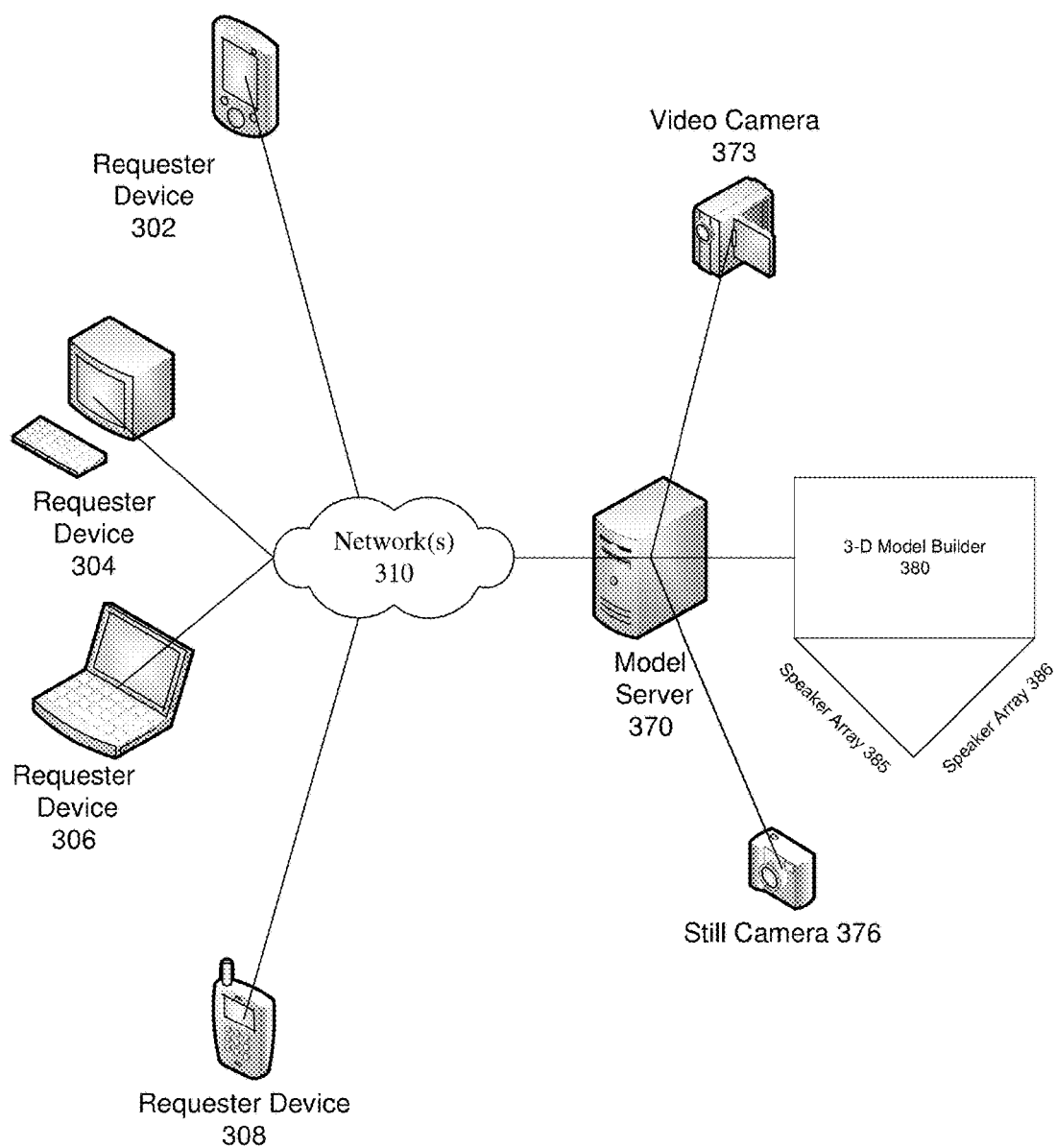
FIG. 3 shows an exemplary network for reusable networked 3-D printing, according to an aspect of the present disclosure.

FIG. 3 shows an exemplary network for reusable networked 3-D printing, according to an aspect of the present disclosure. In FIG. 3, a user uses user devices such as a personal digital assistant 302, desktop computer 304, portable computer 306 or smartphone 308. The user devices 302, 304, 306 and 308 have several features in common, including computer processor components and memory components. The user devices 302, 304, 306 and 308 also can each use the internet to request and receive images or video from a 3-D model builder 380.

In FIG. 3, one or more network(s) 310 are used by the user devices 302, 304, 306 and 308 to contact the 3-D model builder 380 via a model server 370. The network(s) 310 may include both landline wired and wireless networks, as well as any form of network that can carry data such as images, videos, and text.

In FIG. 3, the 3-D model builder 380 is a system that is part of a local network that also includes model server 370, video camera 373 and still camera 376. The model server 370 can receive the requests for physical 3-D models of items from the user devices 302, 304, 306 and 308, and then coordinate the actual building of the physical 3-D model by the 3-D model builder 380. The video camera 373 is used to take videos of the resultant physical 3-D model, and the still camera 376 is used to take images of the resultant physical 3-D model. The video taken by the video camera 373 and the images taken by the still camera 376 can be sent to the requester via the model server 370 and the network(s) 310. Of course, the video and the images taken by the video camera 373 and still camera 376 include video and images of the 3-D model of the requested item. The video and images may also include embedded digital rights management information that is embedded by the video camera 373, still camera 376 or model server 370, or even include images or video of, for example, a log built physically by the 3-Do model builder 380.

The 3-D model builder 380 may itself include a fixed space, such as an enclosure enclosed by walls and a floor. Speaker arrays 385 and 386 are provided to generate sound waves to actually selectively levitate and manipulate model components into place for the physical 3-D model. In this way, the 3-D model builder 380 can maintain the model components in an enclosed space, so that the model components can be used and reused, stored and retrieved from storage, and used repeatedly to build multiple different models on-demand by different requesters.

Although not required, the models built by the 3-D model builder 380 may be built without any particular human input at the 3-D model builder. That is, a request may be received by the model server 370. The request can include information indicative of physical characteristics of an item requested by the requester. In this way, the model server 370 can transform the information into model data for a 3-D model, and then actually generate the 3-D model using stored components and the speaker arrays 385, 386.

An example of how a 3-D model can be of use is when one is created temporarily to represent articles that can be ordered. For example, a 3-D model may be created as a full size representation of an article that can be shipped to a requester, or as a miniaturized representation of an article shown only online such as a house or furniture. Such physical 3-D models can show physical characteristics of the item being represented, such as texture, light reflection and other physical attributes. Additionally, a 3-D modeling system can be used to create several items, so that one particular proposed item can be shown in context with other items.

Figure 4:
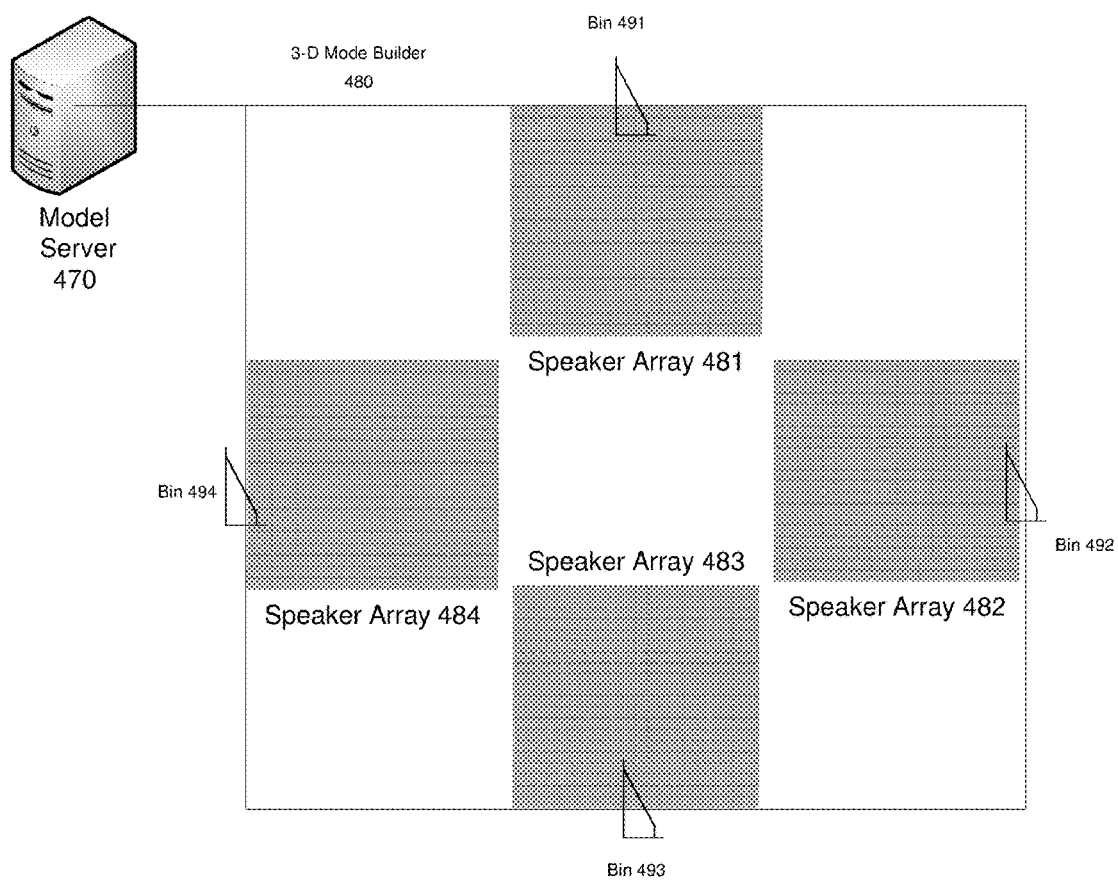
FIG. 4 shows an exemplary system for reusable networked 3-D printing, according to an aspect of the present disclosure.

FIG. 4 shows an exemplary system for reusable networked 3-D printing, according to an aspect of the present disclosure. In FIG. 4, a model server 470 is used to coordinate the building of a 3-D physical model by 3-D modeling builder 480. The model server 470 may actually control the building of the 3-D physical model also, but may merely pass instructions to a local controller installed in the 3-D model builder 480, such that the local controller controls the building of the 3-D physical model.

The 3-D model builder 480 includes four arrays of speakers 481, 482, 483 and 484. Each speaker array may have tens, hundreds, or even thousands of small individual speakers that each emit a sound wave isolated from other sound waves emitted by other individual speakers. The 3-D model builder 480 also includes four bins 491, 492, 493, 494, which are each used to store components for constructing the 3-D models. Of course, rather than having one bin for each speaker array, each speaker array may be provided with multiple segregated bins that each store different components to be used for 3-D models. For example, each speaker array may have a separate storage for different colors of components, different weights of components, different sizes of components, different densities of components, and so on.

In FIG. 4, the speaker arrays 481, 482, 483 and 484 are shown placed on four sides of an enclosed display area of the 3-D model builder 480. Similarly, the 3-D model builder 380 shown in FIG. 3 was shown with two speaker arrays 385, 386 that were placed under the 3-D model builder 380's display area. The individual arrays 385, 386, 481, 482, 483, 484 may be angled offset from a vertical position, so as to ensure that the sound waves are biased upwards so as to levitate components used to build the 3-D physical models, while also ensuring that sound waves from opposing speaker arrays do not counter one another.

Figure 5:
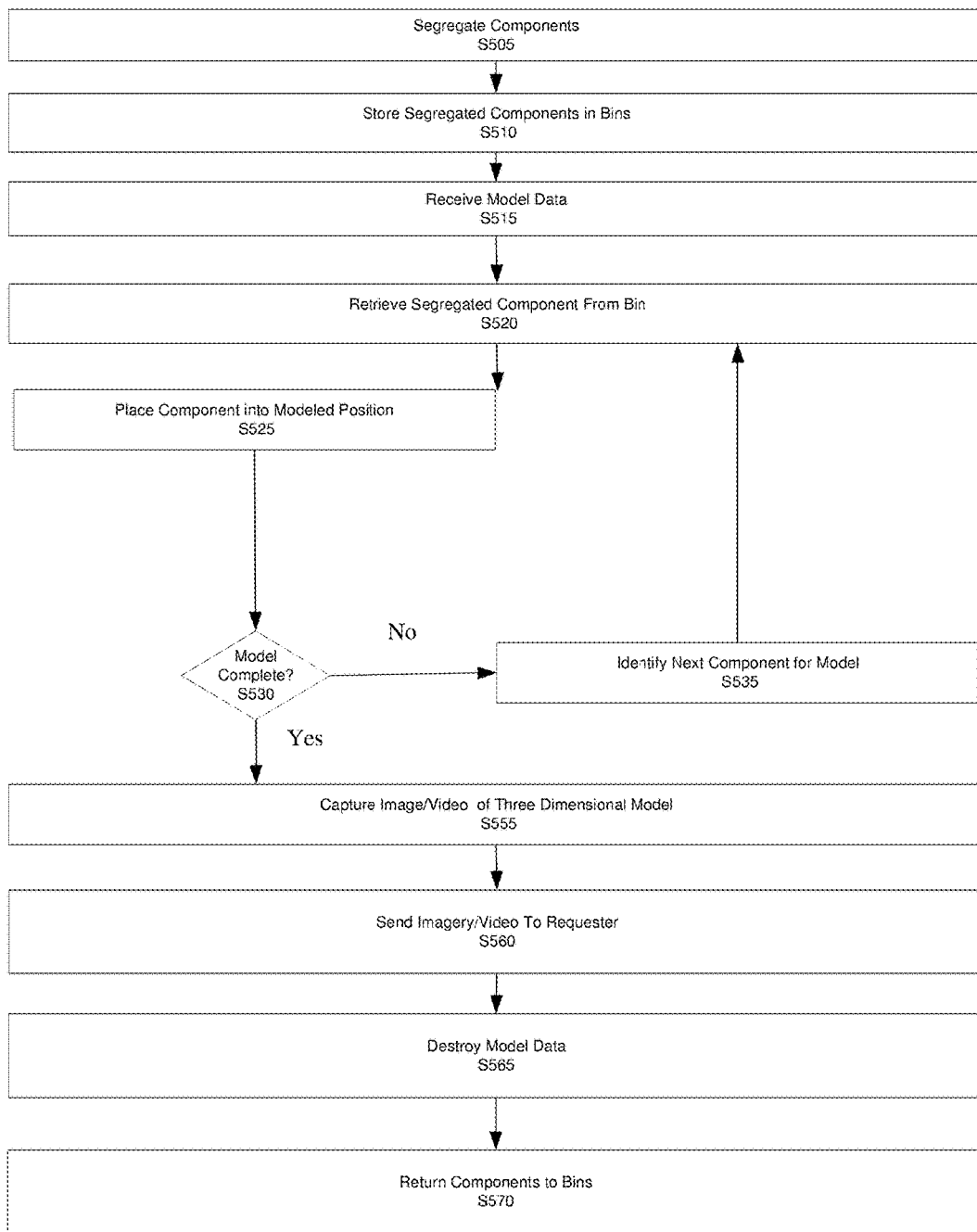
FIG. 5 shows an exemplary method for reusable networked 3-D printing, according to an aspect of the present disclosure.

FIG. 5 shows an exemplary method for reusable networked 3-D printing, according to an aspect of the present disclosure. In FIG. 5, components are segregated at S505, such as by type, color, weight. At S510, segregated components are stored in different bins.

At S515, model data is received from, for example, a model server 470. The model data can indicate placement and characteristics (type, color, weight etc.) of each component to be used in the 3-D physical model to be built. At S520, a segregated components is retrieved from a bin, and at S525 placed into a modeled position.

At S530, a determination is made whether the 3-D model is complete. If the 3-D model is not complete, (S530=No), the next component for the model is identified at S535, and the process returns to S520 to retrieve a segregated component from a bin. The process continues in this way until the model is complete (S530=Yes).

When the process of building the model is complete (S530=Yes), at S555 images or video of the resultant model are captured, and at S560 sent to the requester over the internet. The images or video may be sent via streaming, or by email, or by display on a webpage to which the requester is directed. In any event, the images or video may also be sent in a format that cannot be saved, or copied, or in a format that can be saved or copied when the requester is entitled to the digital rights to the images or video.

At S565, the model data is destroyed, and at S570 the components used to build the model are returned to the bins from which they were obtained. The model data may be destroyed when the model data is generated from characteristic data that is not judged unlikely to be received again, such as for unique items. Alternatively, model data may be stored by the model server 470 in a database when the model data is for an item such as one offered for sale on a website.

Figure 6:
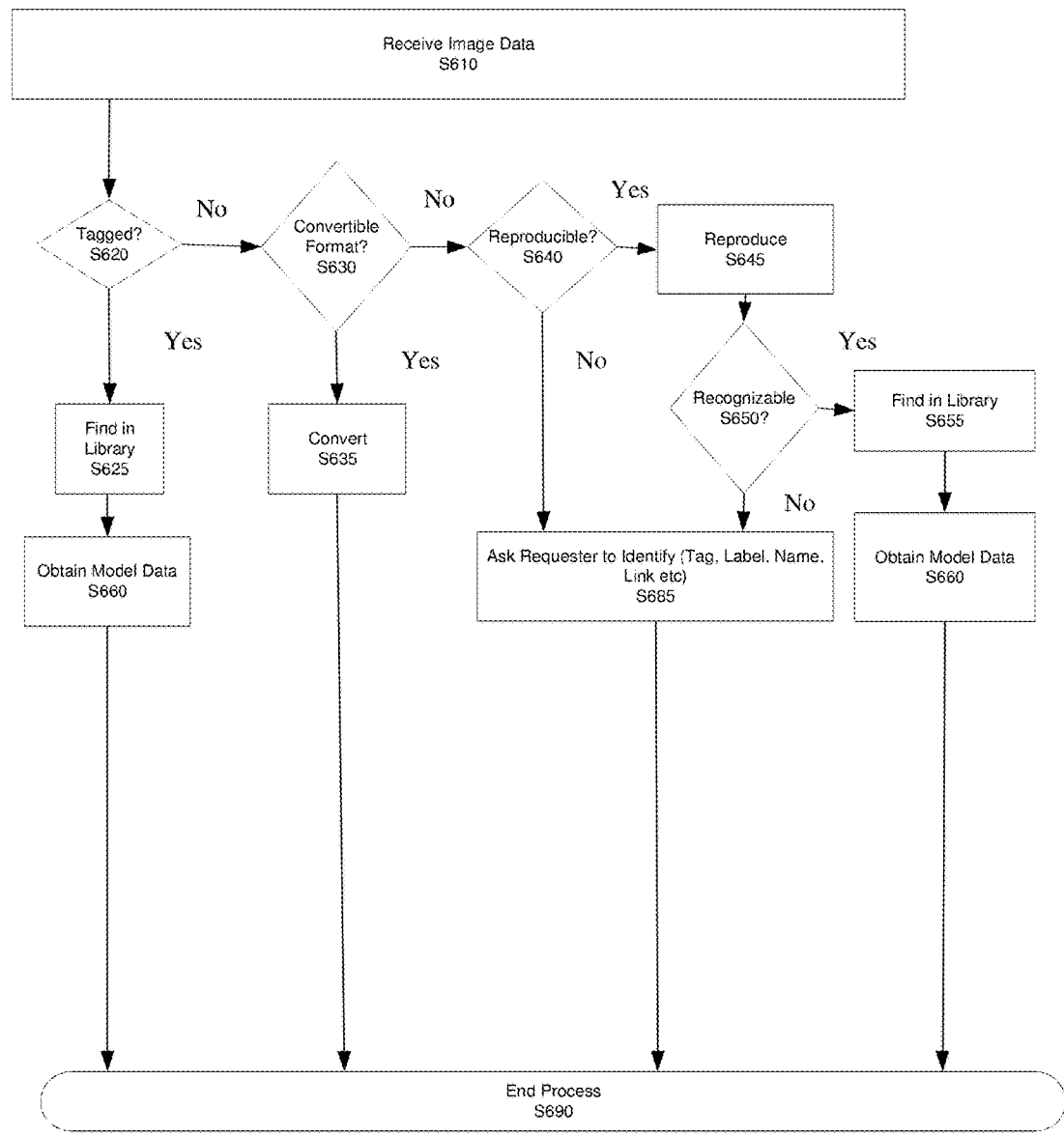
FIG. 6 shows an exemplary method for reusable networked 3-D printing, according to an aspect of the present disclosure.

FIG. 6 shows an exemplary method for reusable networked 3-D printing, according to an aspect of the present disclosure. In FIG. 6, a series of determinations are made to find whether and how received information indicative of physical characteristics of an item can be converted into model data. At S610, image data is received. Image data may be a tag, a description, formatted image data that can be convertible to produce a 3-D model, formatted image data that is immediately reproducible as a 3-D model, and/or other forms of data indicative of physical characteristics of an item. As described below and elsewhere herein, the term "image data" is used for consistency, though so-called "image data" may not actually be data derived from an image.

At S620, a model server 370, 470 determines whether the received image data is tagged. A tag received as or for image data is information that can be used to retrieve additional information from a database, a library, an external website, or another information source in order to help in the process of generating model data and ultimately a 3-D model. A tag identified at S620 may include information such as any of the following:

a name of a product or image of a product
a numeric or alphanumeric reference to a product or image of a product
a location such as a memory location or website address of information for a product or image If no tag is identified in the received image data at S620 (S620=No), a determination is made at S630 whether the received image data is image data in a format convertible to 3-D model data. The determination at S630 may include analyzing header information of packets that include the image data to check for format information of loads in the packets that include the image data. The check at S630 may be a determination whether the format of image data is even recognizable by the model server 370, 470. If the format of the image data is not recognized and not ascertainable, the model server 370, 470 may automatically reply to the requester to advise the requester that the format of the image data received with the request is not recognized.

If the format of the image data is determined at S630 to be non-convertible (S630=No), a determination is made at S640 whether the image data received at S610 is reproducible. Reproducible image data is data that can be reproduced into an image by the model server 370, 470. Reproducible image data may include, for example, joint photographic experts group (JPEG) formatted data, tagged image file format (TIFF) formatted data, graphics interchange format (GIF) formatted data, and other forms of existing or developed image formats. A model server 370, 470 may recognize (S640=Yes) such formats from header information or based on the raw data included in the received image data, and then reproduce an image of the item to be modeled at S645.

A determination is made at S650 as to whether the image reproduced at S645 is recognizable. The decision at S650 may involve an image recognition program that analyzes reproduced images to see if they match an image in a library or database of know images. In this way, a recognized image (S650=Yes) can be found in a library at S655 so that the item requested by the requester can be modeled by the 3-D model builder 380 or 3-D model builder 480.

As described above, image data can be identified when a tag is recognized (S620=Yes), and when an image is reproduced and recognized from the image data (S640=Yes, S650=Yes). In either of the instances where the image data is recognized from a tag or image recognition analysis, the underlying item is identified in a library at S625 or S655. However, a recognized tag or image can also be used to find the underlying item requested by the requester in an external resource such as a website or database of a third-party system.

In the instance of a convertible format being recognized (S630=Yes), the image data is converted into model data at S635. However, in the other instances where the item requested by the requester is found in a library (S625, S655), model data is obtained at S660 and the process ends. When the model data is not tagged (S620=No), not convertible (S630=No), and not reproducible (S640=No) or recognizable (S650=No), the model server 370, 470 may automatically notify the requester at S685, and ask the requester to identify the item requested for modeling. The requester can provide more specific information with a renewed request, such as a tag, label, name, internet link or other form is information that would identify the item to be built by a 3-D model builder 380, 490. When information sufficient to generate model data for a model is received, the process of FIG. 6 will result in the model data at S635 or S660. The process of FIG. 6 ends at S690.

Another example of image data in S620 that is not actually data of an image is a stock keeping unit (SKU) identifier. A stock keeping unit identifier may be pre-correlated with a predetermined 3-D computer aided design (CAD) file that stores model data for a 3-D model of an item. Alternatively, a 2-D image may be transformed using 2D image transformation, or an algorithm for creating 3-D models.

As described with respect to FIG. 6, objects for which a requester requests a 3-D model may have a label, a picture, a stock keeping unit (SKU), and other information. A stock keeping unit may be associated with associated with a 3D computer file, a Maya binary file, or a StereoLithography (STL) format file.

Figure 7:
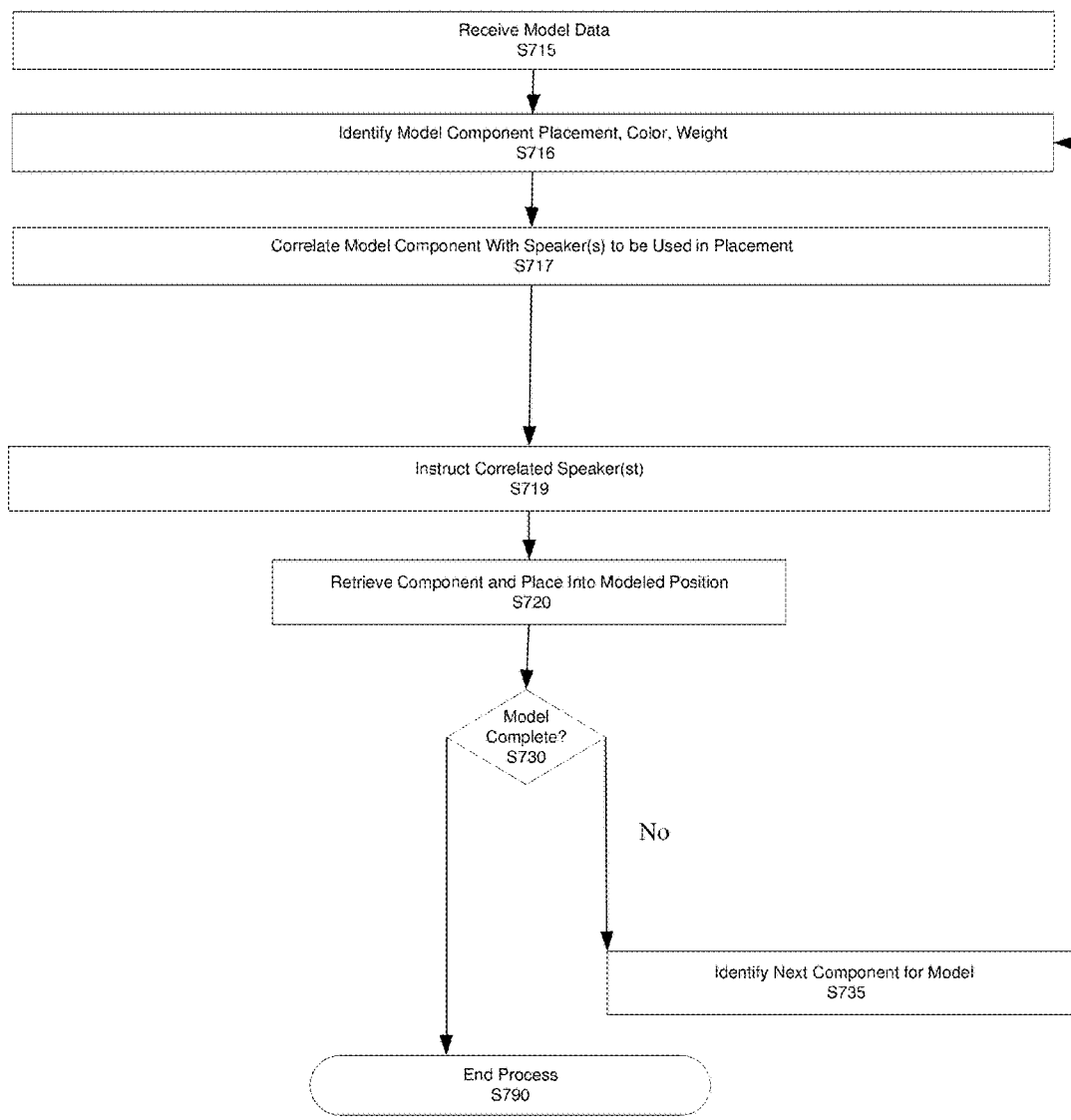
FIG. 7 shows an exemplary method for reusable networked 3-D printing, according to an aspect of the present disclosure.

FIG. 7 shows an exemplary method for reusable networked 3-D printing, according to an aspect of the present disclosure. At S715, model data is received. The model data received at S715 may be the model data obtained at S635 or S660 in FIG. 6. Although not shown in FIG. 7, following the receipt of model data at S715, a 3-D model builder may select a particular 3-D model building system to use in the event that the 3-D model builder has different 3-D model building systems to select from. Different 3-D model building systems can vary in many ways including the size of models that can be built, the level of detail of models that can be built, the 3-D models that can be used by a 3-D model building system, and so on. In this way, a 3-D model builder may even transform image data into a specific format for model data based on which 3-D model building system will be used to generate a temporary 3-D model.

At S716, a model component and characteristic information such as color and weight are identified. At S717, the model component is correlated with a particular speaker in a speaker for placement of the model component. At S719, the correlated speaker is instructed to place the model component into position. At S720, the model component is retrieved and placed into the modeled position. At S730, a determination is made whether the 3-D model is complete. If the model is incomplete (S730=No), the next component for the 3-D model is identified at S735, and the process returns to S716 to identify placement, color and weight information for the model component before placing the next component into position at S730. By repeating the process from S716 to S735, a 3-D model can be iteratively built and completed. When the model is complete (S730=Yes), the process ends at S790.

Figure 8:
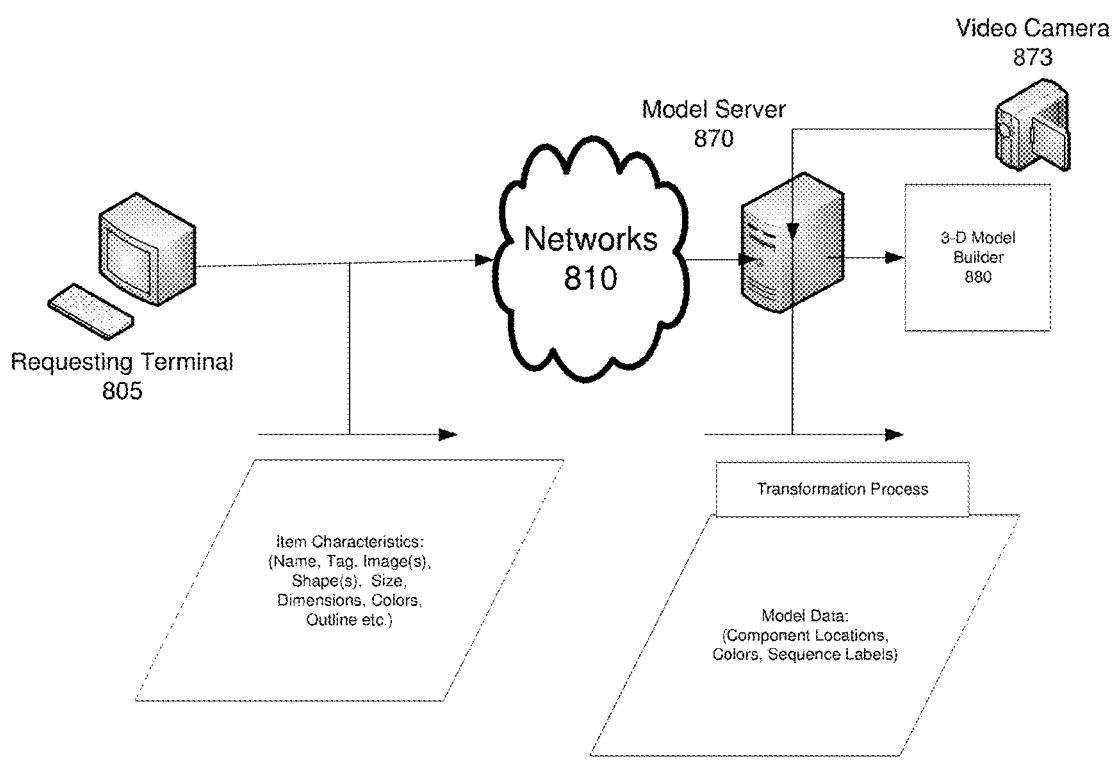
FIG. 8 shows an exemplary method for reusable networked 3-D printing, according to an aspect of the present disclosure.

FIG. 8 shows an exemplary method for reusable networked 3-D printing, according to an aspect of the present disclosure. In FIG. 8, a requester uses a requesting terminal 805 to request that a 3-D model of an item be built by a 3-D model builder 880. The requesting terminal 805 may be a personal computer or other computing device that can communicate over a data network. The requesting terminal 805 sends item characteristics such as name, tag, image(s), shape, size, dimensions, colors, outline to model server 870 so that the 3-D model builder 880 can build the physical 3-D model of the requested item. The information is sent over network(s) 810, which may include the internet or other data networks.

The model sever 870 uses a transformation process to transform the data sent by the requester into model data. Model data can include component locations, colors, sequence labels showing placement of each component, and so on. The model data can also include a correlated speaker array and individual speaker for each component. Once the model data is obtained by the model server 870, the model server 870 controls the 3-D model builder 880 to build the 3-D model of the item requested by the requester. A video camera 873 then captures video of the 3-D model and provides the video to the model server 870 which, in turn, provides the video to the requester at the requesting terminal 805.

In FIG. 8, the video camera 873 may be movable around the 3-D model so that the 3-D model can be captured from different angles and elevations. Alternatively, the 3-D model builder 880 and speaker arrays may be provided on a movable platform that moves so that a fixed video camera 873 can capture video of the 3-D model from different angles and elevations. As yet another alternative, multiple video cameras 873 may be provided to capture video of the 3-D model from different angles.

Accordingly, reusable networked 3-D printing enables users to request images and video of temporary 3-D physical models built with reusable materials. A service provider may provide 3-D model builders for on-demand requests as a subscription or per-request service.

Although reusable networked 3-D printing has been described with reference to several exemplary embodiments, it is understood that the words that have been used are words of description and illustration, rather than words of limitation. Changes may be made within the purview of the appended claims, as presently stated and as amended, without departing from the scope and spirit of reusable networked 3-D printing in its aspects. Although reusable networked 3-D printing has been described with reference to particular means, materials and embodiments, reusable networked 3-D printing is not intended to be limited to the particulars disclosed; rather reusable networked 3-D printing extends to all functionally equivalent structures, methods, and uses such as are within the scope of the appended claims.

Furthermore, the disclosure herein describes levitating and manipulating individual particles with sound waves generated from speakers arranged in arrays. Other forms of 3-D printing can be used in the same or similar manners as 3-D printing using sound waves. For instance, an on-demand service may also be used by a 3-D printing system that uses deposit printers or other forms of additive manufacturing.

Additionally, the disclosure herein describes levitating and manipulating tangible (physical) materials rather than projections or reflections of light. However, virtual 3-D models may also be generated as an on-demand service consistent with the descriptions herein, wherein video of a virtual 3-D model in an actual three dimensional physical space can be taken and sent over the internet to requesters on-demand.

Further, the present disclosure describes manufacturing temporary objects with reusable materials. Such materials are generally solids, as compared to liquids or gases. The materials are not themselves temporary; rather the 3-D structures built with the materials are temporary, and can be deconstructed so that the components used to build the 3-D structures can be returned to storage from which they were retrieved.

The herein disclosure provides for on-demand and real-time creation of 3-D objects. Such objects can be created as a service provided remotely for users directly or via intermediaries such as websites used by the users to view items. Such intermediary websites can include not only retail websites such as Amazon.com™, but also individual websites such as websites provided by artists, furniture designers, home builders and others. Using a remote 3-D model builder, such websites can refer users to a source that can help visualize items in a unique way possible using 3-D printing.

Additionally, an intermediary such as a website provider may have a variety of 3-D model providers to choose from. In this way, an intermediary such as a website provider can allow users to choose from different 3-D model providers. The users can then, for example, select a link to a selected 3-D model provider, and then contact the model server for the selected 3-D model provider in order to provide information used to generate model data for a 3-D model.

Additionally, a 3-D model provider may have different 3-D model builder systems to handle client demands. Such 3-D model builder systems may have different capabilities, such as the size of models that can be built, the types of materials used to build the models, and the level of detail that can be provided for the models. The level of detail may vary, for example, based on how many speaker arrays and individual speakers are provided with the model building system.

The mechanisms described herein include using sound waves to levitate and manipulate small (tiny) components into place for a 3-D model. Such manipulation using sound waves from individually-controlled speakers can include moving and rotating particles in mid-air.

The materials used as components of a 3-D model can be differentiated and segregated in a variety of ways, including by color, by weight, by diameter, and by density. Further, though the disclosure herein mainly describes using different colored components, coloring can be provided for a 3-D model using lights that are synchronized with the speaker arrays and speakers described herein.

The system for generating the 3-D models described herein uses grids (arrays) of speakers (sound emitting devices) controlled via through networked speakers and a server or service controlling those speakers. Sound frequencies emitted by the speakers may be restricted to ranges that are not audible to humans, such as above 20 kHz).

An example of an alternative use for the 3-D modeling system described herein includes models built live and on-scene in a store. 1. For example, a store can provide such a modeling system to and allow users to request or even create representations of different physical objects in the store. Customers could browse through a '3D catalog', and change colors and finishes on each item.

Another exemplary use for the 3-D modeling system described herein includes changing artwork or decorations in a business or residence, such as, for example, for special events. A computer program may control the speaker arrays and individual speakers to build 3-D models and maintain the 3-D models for a period, and even change the 3-D models periodically. In this way, a business or homeowner can display 3-D models with reusable materials as artwork that changes periodically.

A variety of the features herein can be varied within the purview of the present disclosure. For example, while the application mainly describes directing a user to a 3-D model builder from a website, a 3-D model builder may also be contacted directly by a user via, for example, e-mail or even text in order to provide information used to generate a temporary 3-D model. Similarly, while specific arrangements of speaker arrays are shown and described herein, other mechanisms can be used to generate tailored sound waves. Such alternative mechanisms can include offset arrays, movable/mobile arrays, a mobile platform on which 3-D models can be built, and so on. Other alternatives to details and examples mentioned herein may be possible without the scope of the present disclosure.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Standards mentioned herein represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a method of providing a service over a communication network includes receiving, via a communication network from a remote requester, information indicative of physical characteristics of an item requested by the requester and a request to generate a physical three dimensional model for the item specified by the remote requestor. The information indicative of the physical characteristics of the item is transformed into model data used to generate the three dimensional model. Components for generating the physical three dimensional model are obtained from storage. The method further includes generating, using a processor of a computer and based on the model data, the physical three dimensional model for the item specified by the remote requestor. Imagery of the physical three dimensional model is sent to the remote requestor via the communication network. The components used to generate the physical three dimensional model are returned to storage after the imagery of the physical three dimensional model is sent to the remote requester.

According to another aspect of the present disclosure, the physical three dimensional model is generated using sound waves to manipulate physical materials.

According to yet another aspect of the present disclosure, the physical materials are reusable to create multiple physical three dimensional models for different items.

According to still another aspect of the present disclosure, the sound waves are used to levitate particles of the physical material in mid-air.

According to another aspect of the present disclosure, the sound waves are used to rotate particles of the physical material in mid-air.

According to yet another aspect of the present disclosure, the sound waves are used to move particles of the physical material in mid-air.

According to still another aspect of the present disclosure, the requestor is a recipient of a request from a customer to view an item provided by the requestor.

According to another aspect of the present disclosure, the request to generate the physical three dimensional model is received by an entity that generates physical three dimensional models as a service for multiple requestors that each request different physical three dimensional models for different items.

According to yet another aspect of the present disclosure, the sound waves are generated using grids of speakers that are each selectively controlled by the processor of the computer.

According to still another aspect of the present disclosure, the information indicative of the physical characteristics of the item requested by the requester is received over the communication network from a source different than the requester.

According to another aspect of the present disclosure, the information indicative of the physical characteristics of the item requested by the requester is obtained from a database library that stores physical characteristics of a plurality of items.

According to still another aspect of the present disclosure, the communication network is the internet, and the requestor receives requests from customers via an internet webpage.

According to yet another aspect of the present disclosure, the information indicative of the physical characteristics of the item includes 2-dimensional visual information showing a visualization of the item.

According to another aspect of the present disclosure, the method includes transforming the 2-dimensional visual information into a format compatible with the computer.

According to yet another aspect of the present disclosure, the information indicative of the physical characteristics of the item includes a stock-keeping unit identifier.

According to still another aspect of the present disclosure, the method further includes mapping the stock-keeping unit identifier to a three-dimensional computer-aided-design file. The model data used to generate the three dimensional model is based on the computer-aided design file.

According to another aspect of the present disclosure, the storage includes multiple different bins, and a component is obtained from and returned to the same bin based on a stored correlation between the bin and the component.

According to yet another aspect of the present disclosure, an image of the three dimensional model includes embedded digital rights management information.

According to still another aspect of the present disclosure, the method includes deleting the model data used to generate the three dimensional model after the three dimensional model is generated. The model data is restricted to a single use.

According to another aspect of the present disclosure, the method includes confirming to a database library that the model data has been deleted and that the components have been returned to storage, after returning the components to storage.

According to an aspect of the present disclosure, a tangible computer readable storage medium stores a computer program. When executed by a processor, the computer program causes a computer apparatus to perform a process that includes receiving, via a communication network from a remote requester, information indicative of physical characteristics of an item requested by the requester and a request to generate a physical three dimensional model for the item specified by the remote requester. The information indicative of the physical characteristics of the item is transformed into model data used to generate the three dimensional model. Components for generating the physical three dimensional model are obtained from storage. The process also includes generating, using a processor of a computer and based on the model data, the physical three dimensional model for the item specified by the remote requestor. Imagery of the physical three dimensional model is sent to the remote requestor via the communication network. The components used to generate the physical three dimensional model are returned to storage after the imagery of the physical three dimensional model is sent to the remote requester.

According to an aspect of the present disclosure, a computer apparatus includes a memory that stores instructions, and a processor that executes the instructions. When executed by the processor, the instructions cause the processor to perform operations that include receiving, via a communication network from a remote requester, information indicative of physical characteristics of an item requested by the requester and a request to generate a physical three dimensional model for the item specified by the remote requestor. The information indicative of the physical characteristics of the item is transformed into model data used to generate the three dimensional model. Components for generating the physical three dimensional model are obtained from storage. The operations include generating, using a processor of a computer and based on the model data, the physical three dimensional model for the item specified by the remote requestor. Imagery of the physical three dimensional model is sent to the remote requestor via the communication network. The components used to generate the physical three dimensional model are returned to storage after the imagery of the physical three dimensional model is sent to the remote requester.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing a service over a communication network, comprising:
   receiving, via the communication network from a remote requester, information indicative of physical characteristics of an item requested by the remote requester and a request to generate a physical three dimensional model for the item specified by the remote requester;
   transforming, using a processor of a computer, the information indicative of the physical characteristics of the item into model data used to generate the physical three dimensional model;
   obtaining components for generating the physical three dimensional model from storage;
   generating, using sound waves generated by an array of speakers and based on the model data, the physical three dimensional model for the item specified by the remote requester;
   sending imagery of the physical three dimensional model to the remote requester via the communication network, and
   returning the components used to generate the physical three dimensional model to the storage after the imagery of the physical three dimensional model is sent to the remote requester,
   wherein the array of speakers are each selectively controlled by the processor of the computer, and the array of speakers are arranged such that a sound wave emanating from one of the speakers does not directly counter another sound wave emanating from an opposing speaker.

2. The method of claim 1,
   wherein the physical three dimensional model is generated using the sound waves to manipulate physical materials.

3. The method of claim 2,
wherein the physical materials are reusable to create multiple physical three dimensional models for different items.

4. The method of claim 2,
wherein the sound waves are used to levitate particles of the physical materials in mid-air.

5. The method of claim 2,
wherein the sound waves are used to move particles of the physical materials in mid-air.

6. The method of claim 1,
wherein the remote requester is a recipient of a request from a customer to view an item provided by the remote requester.

7. The method of claim 1,
wherein the request to generate the physical three dimensional model is received by an entity that generates physical three dimensional models as a service for multiple remote requesters that each request different physical three dimensional models for different items.

8. The method of claim 1,
wherein the information indicative of the physical characteristics of the item requested by the remote requester is received over the communication network from a source different than the remote requester.

9. The method of claim 1,
wherein the information indicative of the physical characteristics of the item requested by the remote requester is obtained from a database library that stores physical characteristics of a plurality of items.

10. The method of claim 1,
wherein the information indicative of the physical characteristics of the item includes 2-dimensional visual information showing a visualization of the item.

11. The method of claim 10, further comprising:
transforming the 2-dimensional visual information into a format compatible with the computer.

12. The method of claim 10,
wherein the information indicative of the physical characteristics of the item includes a stock-keeping unit identifier.

13. The method of claim 12, further comprising:
mapping the stock-keeping unit identifier to a three-dimensional computer-aided-design file,
wherein the model data used to generate the physical three dimensional model is based on the three-dimensional computer-aided-design file.

14. The method of claim 1,
wherein the storage includes multiple different bins, and
wherein a component is obtained from and returned to a same bin based on a stored correlation between a bin and the component.

15. The method of claim 1,
wherein an image of the physical three dimensional model includes embedded digital rights management information.

16. The method of claim 1, further comprising:
deleting the model data used to generate the physical three dimensional model after the physical three dimensional model is generated,
wherein the model data is restricted to a single use.

17. The method of claim 1, further comprising:
after returning the components to storage, confirming to a database library that the model data has been deleted and that the components have been returned to storage.

18. A non-transitory tangible computer readable storage medium that stores a computer program, the computer program, when executed by a processor, causing a computer apparatus to perform a process comprising:
receiving, via a communication network from a remote requester, information indicative of physical characteristics of an item requested by the remote requester and a request to generate a physical three dimensional model for the item specified by the remote requester;
transforming the information indicative of the physical characteristics of the item into model data used to generate the physical three dimensional model;
obtaining components for generating the physical three dimensional model from storage;
generating, using sound waves generated by an array of speakers and based on the model data, the physical three dimensional model for the item specified by the remote requester;
sending imagery of the physical three dimensional model to the remote requester via the communication network, and
returning the components used to generate the physical three dimensional model to the storage after the imagery of the physical three dimensional model is sent to the remote requester,
wherein the array of speakers are each selectively controlled by the processor of the computer apparatus, and the array of speakers are arranged such that a sound wave emanating from one of the speakers do not directly counter another sound wave emanating from an opposing speaker.

19. A computer apparatus, comprising:
a memory that stores instructions, and
a processor that executes the instructions,
wherein, when executed by the processor, the instructions cause the processor to perform operations comprising:
receiving, via a communication network from a remote requester, information indicative of physical characteristics of an item requested by the remote requester and a request to generate a physical three dimensional model for the item specified by the remote requester;
transforming, using the processor, the information indicative of the physical characteristics of the item into model data used to generate the physical three dimensional model;
obtaining components for generating the physical three dimensional model from storage;
generating, using sound waves generated by an array of speakers and based on the model data, the physical three dimensional model for the item specified by the remote requester;
sending imagery of the physical three dimensional model to the remote requester via the communication network, and
returning the components used to generate the physical three dimensional model to the storage after the imagery of the physical three dimensional model is sent to the remote requester,
wherein the array of speakers are each selectively controlled by the processor of the computer apparatus, and the array of speakers are arranged such that a sound wave emanating from one of the speakers do not directly counter another sound wave emanating from an opposing speaker.

* * * * *